United States Patent [11] 3,620,758

[72] Inventors Herman H. Friedman
 Bayside;
 Esra Pitchon, Flushing; Alexander S. Cascione, Yonkers; Burton L. Banks, Dobbs Ferry, all of N.Y.
[21] Appl. No. 4,406
[22] Filed Jan. 20, 1970
[45] Patented Nov. 16, 1971
[73] Assignee General Foods Corporation
 White Plains, N.Y.

[54] PROCESS FOR OBTAINING AN AROMATIZED COFFEE EXTRACT
 10 Claims, No Drawings
[52] U.S. Cl. .................................................... 99/71, 99/65
[51] Int. Cl. ..................................................... A23f 1/04, A23f 1/08
[50] Field of Search ........................................ 99/65, 68, 71

[56] References Cited
 UNITED STATES PATENTS

| Patent No. | Date | Inventor | Class |
|---|---|---|---|
| 2,278,473 | 4/1942 | Musher | 99/65 |
| 3,244,531 | 4/1966 | Clinton et al. | 99/71 |
| 3,244,532 | 4/1966 | Mahlmann | 99/71 |
| 3,420,674 | 1/1969 | McCartney | 99/71 |
| 3,421,901 | 1/1969 | Mahlmann et al. | 99/71 |
| 3,476,566 | 11/1969 | White et al. | 99/71 |

Primary Examiner—Frank W. Lutter
Assistant Examiner—William L. Mentlik
Attorneys—Gerald E. Jacobs and Thomas V. Sullivan ABSTRACT: A method of obtaining an aromatized coffee extract wherein the extracting medium is introduced into a column of coffee which has been subjected to steaming under isolated conditions before the column is vented to the atmosphere. In this manner, the extracting medium condenses the aromatic volatiles and when the coffee extract is drawn off from the column it contains, uniformly dispersed therein, the desired aromatic volatiles.

PROCESS FOR OBTAINING AN AROMATIZED COFFEE EXTRACT

BACKGROUND OF THE INVENTION

This invention concerns an improved method of producing a coffee extract suitable for further processing to obtain a soluble coffee. More particularly, it pertains to a new technique for obtaining a coffee extract fortified with steam distilled aromas.

There are many prior art processes which describe various techniques for steaming roasted and ground coffee to obtain a steam-distilled aroma fraction which can be used to enhance the flavor and aroma of coffee extract. These prior art techniques included steaming at atmospheric pressure, under a vacuum and at elevated pressures. The methods developed to date have one thing in common, the aromatic materials are carried off by the steam to an external condensing system. At the external condensers the water vapors and desired aromatic components are condensed, collected, stored for short periods of time at cold temperatures and then redistributed in extract prior to drying. The condensed material may or may not be subjected to a fractionation process prior to storage.

These prior art methods required elaborate condensing and collection systems made of special materials of construction to prevent rapid degradation of the aromatic constituents. They also require storage at temperatures well below atmospheric temperature to avoid rapid degradation. In spite of special operating procedures designed to protect the aromatic materials, it has been found that in a highly concentrated form the aromatic constituents start to react in storage, thereby adversely effecting the quality and stability of the final product when they are added back to a coffee extract.

SUMMARY OF THE INVENTION

It has been discovered that some prior art processes for obtaining steam-distilled aromas can be significantly improved by condensing and collecting the aromatic material in the same vessel in which the steaming operation is performed. The process of this invention is useful in those prior art processes wherein the roasted and ground coffee is held at elevated temperatures and pressures in a confined vessel prior to venting off and collecting the desired aromatic material. Such a process is described in pending application Ser. No. 849,531, filed 8/12/69 entitled Confined Volume Coffee Aroma.

In practicing the process of this invention roasted and ground coffee is placed in a vessel and subjected to the introduction of steam in the vessel until the gases in the vessel have been displaced and the temperature of the coffee has been raised to at least 212° F. The vent on the vessel is then closed and additional steam is introduced to raise the pressure within the vessel to a desired level, usually from 1.0 to 100 p.s.i.g. At this point the steam flow is cut off and the vessel is isolated and maintained under pressure for a period of about 15 seconds to 10 minutes depending upon the specific operating conditions.

In the prior art processes a vent valve would then be opened and a combination of water vapor and aromatic volatiles would be allowed to escape from the pressurized vessel and collected in an external condensing system. In the process of this invention an extracting medium is introduced into the isolated vessel. The extracting medium condenses and dissolves the aromatic material formed while at the same time extracting soluble solids from the roasted and ground coffee. In this manner, a coffee extract fortified with steam-distilled aromatic constituents is obtained without resort to any special external condensing systems, storage systems or addback systems. Also, the aromatic materials are uniformly dispersed throughout the extract without ever coming into contact with each other in a concentrated liquid form, thus avoiding much of the degradation believed to occur due to contact of these highly reactive constituents.

The extracting medium can be water. However, a preferred extracting medium is coffee extract obtained from the second stage of a commercial percolation system. Thus, a preferred embodiment of this invention is to use a percolator column as the vessel in which the roasted and ground coffee is steamed and to then place this vessel on stream as the fresh stage in a commercial percolator set.

DESCRIPTION OF THE PREFERRED EMBODIMENT

In the pending application entitled Confined Volume Coffee Aroma previously referred to, White et al. disclose and claim a unique system for obtaining desirable steam-distilled aromatic constituents from roasted and ground coffee. The critical processing conditions therein defined, up to the point where the aromatic materials are allowed to escape from the vessel, are also critical in the process of this invention. However, the unique method of collecting the aromatic volatiles via the process of this invention allow a wider range of operating conditions and result in newly identified preferred conditions. Thus, it has been found that the moisture content of the roasted coffee should be from 1 to 40 percent by weight of the coffee prior to the steaming operation, and that a preferred moisture content is from 7 to 25 percent.

Coffee, at a desired moisture level, is charged into a pressure vessel wherein it is heated by passing steam through the vessel. The coffee is heated to above 212° F. and preferably to a temperature of from 240°–350° F. When the gases have been displaced and a predetermined temperature achieved, the vent valve is closed and the pressure in the vessel is increased to above atmospheric pressure by continuing the flow of steam into the vessel. When the pressure has been increased to a preselected level, generally from 1.0 to 100 p.s.i.g., the vessel is isolated by closing off the flow of steam. A preferred pressure range is 1.0 to 20 p.s.i.g.

In order to avoid unnecessary degradation of the roasted and ground coffee it has been found that time is a critical factor in the process of this invention. While up to 20 minutes has been used in the preheating step, it is desirable to complete the preheating within 5 minutes and most preferably in about 1–2 minutes. The heating time will vary depending upon the size and shape of the pressure vessel and the quantity of coffee in the vessel. Time can be controlled to some extent by use of steam at a sufficiently high pressure to achieve the desired heating effect within a specified time. It is preferred to use steam at a pressure of from 50 to 100 p.s.i.g. to minimize the steaming time.

The time of contact in the pressurized vessel is also critical. An upper limit of 10 minutes has been found essential to avoid serious degradation of the base flavor of the roasted coffee. In times of less than 15 seconds, it has been found that a desired quantity and quality of aromatic volatiles is not achieved. When holding the coffee at a pressure of 10 to 20 p.s.i.g., a holdup time of from 2–4 minutes is preferred. At higher pressures, the holdup time should be reduced to less than 2 minutes.

After the steaming operation has been completed an extracting medium is introduced into the isolated vessel. The temperature of this extracting medium should be low enough to cool the roasted coffee to below 200° F. and to condense the water vapors and aromatic constituents contained within the pressurized vessel. Thus it has been found that the extracting medium should be at a temperature of from 50° to a maximum of 195° F. It is preferred to use an extracting medium temperature of 170° F. maximum and to cool the coffee to below 180° F.

It is a preferred embodiment of this invention to use coffee extract from the second stage of a commercial percolator set as the extracting medium and to use a percolator column as the vessel in which the steaming operation is performed. In a commercial percolation operation roasted and ground coffee is extracted in a set of percolator columns typically consisting of from 6 to 8 columns. The percolation process is a countercurrent, semicontinuous operation. Water flows through the columns from the column containing the most extracted coffee on through the column containing freshly charged roasted and ground coffee. Coffee extract is drawn off from this fresh material (fresh stage) and at the completion of the drawoff a new column containing freshly charged coffee is placed on stream. While the extract from the column containing the second most recently charged coffee (second stage) is filling the fresh stage, coffee in the column containing the most extracted material is emptied and refilled with freshly ground roasted coffee. In this manner at the completion of each drawoff cycle extract there is a freshly loaded column ready to be placed on stream as the new fresh stage.

In the process of this invention the new fresh stage would contain the roasted and ground coffee which has been subjected to steaming and held under pressure for a specified period of time. In a standard percolation operation the flow of extract through the columns is from the bottom of the percolator column up through the top of the column. Normal extract flow can be used in the process of this invention.

It has been found that a preferred technique in practicing the process of this invention, is to pass the extract into the column from the top down to the bottom, at least while filling the column. By using this downflow technique it has been found that the extract more intimately contacts greater areas of the roasted coffee as the column is being filled and thereby more uniformly absorbs the aromatic materials which have been formed.

The pressurized vessel is not vented as the liquid is introduced into the column. In this manner the pressure in the column is actually relieved by the condensation of the vapors as the extracting medium cools, condenses and absorbs the aromatic material and water vapors present in the isolated vessel. It has been found in some instances that it is difficult to completely relieve the pressure in the vessel by this means. Thus, when the vessel has been filled and extract is drawn off from the column some uncondensed gases may tend to escape. In the normal extraction process extract drawn off from a percolator column passes through a cooler and is collected in a large scale tank. It has been found that if a small quantity of extract is kept in this scale tank when the drawoff of extract from the percolator column is commenced, that any escaping vapors will tend to be collected and condensed by this extract in the drawoff tank. While the extracting medium is filling the percolator column, it is preferred to maintain a backpressure on the cooler in order to inhibit the escape of vapors from the percolator. Back pressures of 100 p.s.i.g. and even higher have been found satisfactory. A preferred pressure is from 50 to 100 p.s.i.g.

By the process of this invention an aromatized extract is obtained wherein the aromatic constituents are uniformly dispersed throughout the entire batch of extract. The extract can then be subjected to further processing to obtain a dry powder commonly referred to as soluble coffee. A preferred technique is to freeze the aromatized extract and freeze dry the frozen extract.

The process of this invention will be further described by reference to the following examples:

EXAMPLE I 400 grams of roasted and ground coffee at a moisture content of 10 percent were placed in a glass column, 2 inches in diameter by 35 inches in length. Live steam at a pressure of 3 lbs. gage was introduced at the bottom of the column and allowed to flow through the column until the gases in the column had been displaced and the temperature of the coffee had reached 215° F. The column was then isolated and maintained at a pressure of 2 p.s.i.g. for 5 minutes. Total time elapsed for the heating and holding operations was 20 minutes. 500 ml. of water at 200° F. were then added to the top of the column and allowed to fill the column and condense the vapors and aromatic constituents. When the column was filled a bottom valve was opened and extract was drawn off at the bottom. Coffee extract containing 15 percent solids by weight was thus obtained.

It was found that the extract was fortified with aromatic constituents formed during the steaming operation. While the quality of this extract was not as good as that obtained under the preferred conditions of the process of this invention, this experiment demonstrated that the process of this invention was indeed applicable as a means of collecting aromatic volatiles formed during a steaming operation.

EXAMPLE II 105 lbs. of roasted and ground coffee beans at a moisture content of 20 percent was loaded into a stainless steel insulated column (8 inches in diameter by 14 feet) which had been preheated to a temperature of 350° F. Steam at 40 p.s.i.g. was fed into the bottom of the column to heat the beans and flush out the air through a vent line at the top of the column. After 1½ minutes the gases exiting from the vent lines had reached a temperature of about 240° F. and the vent valve was closed. The pressure in the column was raised to 30 p.s.i.g. by continuing to feed steam into the column for about 1 minute. The column was then isolated by closing off the steam line and the coffee was maintained under pressure for 2 minutes. Extract obtained from the second stage of a commercial percolator set was fed into the bottom of the column at a temperature of 175° F. When the column was filled, extract was drawn off at the top of the column to obtain what would be a normal yield if this column were the fresh stage of a commercial percolation set. The cooler was maintained under a pressure of 75 p.s.i.g. while the percolator column was being filled and the drawoff was taken in order to increase the efficiency of the process of this invention and trap a greater percentage of the generated aromatic volatiles.

The extract thus obtained was found to contain desirable aromatic constituents not present in extract obtained from a commercial percolation set using the same blend of coffee. These desirable flavor characteristics resulted in an extract significantly preferred over the standard percolator extract.

EXAMPLE III

Example II was repeated but the extract was introduced into the column at the top of the column and allowed to flow down through the column. It was found that the desired flavor characteristics were even more enhanced when using downflow as compared to the extract obtained in example II.

The foregoing examples were for illustrative purposes only. The process of this invention is intended to be limited only by the appended claims.

We claim:

1. A process for obtaining an aromatized coffee extract comprising placing roasted and ground coffee in a vessel, said roasted coffee having a moisture content of from 1 to 40 percent by weight, passing steam into said vessel through a steam inlet line thus heating the roasted coffee to a temperature of from 215° to 350° F. and displacing gases in the vessel, said gases being forced out a vent line, closing said vent line when the exiting gases are at a predetermined temperature, continuing to pass steam into the vessel until the pressure within the vessel is increased to a level of from 1.0 to 100 p.s.i.g., the temperature of the coffee having been raised to a temperature at least equivalent to the temperature of saturated steam at the elevated pressure, closing off the steam inlet line thus isolating the vessel at the elevated pressure, maintaining the roasted and ground coffee under pressure for from 15 seconds to 10 minutes; filling the vessel with an extracting medium at a temperature of from 50° to 190° F., thereby condensing and dissolving water vapors and aromatic volatiles produced during the steaming operation, cooling the roasted coffee to below 200° F. and extracting soluble solids from the roasted and ground coffee; drawing off a predetermined quantity of coffee extract from the vessel, said extract being the extracting medium enriched with extracted soluble solids and aromatic volatiles.

2. The process of claim 1 wherein the vessel is a percolator column and the extracting medium is second stage extract.

3. The process of claim 2 wherein the pressure in the isolated percolator column is from 10 to 20 p.s.i.g. and the column is maintained under isolated conditions for from 2 to 4 minutes.

4. The process of claim 2 wherein the extracting medium is at a temperature of less than 170° F. and the roasted coffee is cooled to below 180° F.

5. The process of claim 3 wherein the pressure in the isolated percolator column is from 10 to 20 p.s.i.g. and the column is maintained under isolated conditions for from 2 to 4 minutes.

6. The process of claim 2 wherein the extract drawn off from the percolator column passes through a cooler and a backpressure is maintained on the cooler while the extract is being drawn off, said backpressure inhibiting the escape of volatiles from the percolator column, said backpressure being at least 10 p.s.i.g.

7. The process of claim 6 wherein the backpressure is from 50 to 100 p.s.i.g.

8. The process of claim 2 wherein the moisture content of the coffee prior to steaming is from 7 to 25 percent.

9. The process of claim 8 wherein the extracting medium is at a temperature of less than 170° F. and the roasted coffee is cooled to below 180° F. and wherein the pressure in the isolated percolator column is from 10 to 20 p.s.i.g. and the column is maintained under isolated conditions for from 2 to 4 minutes and wherein the extract drawn off from the percolator passes through a cooler and a backpressure is maintained on the cooler while the extract is being drawn off, said backpressure being at least 10 p.s.i.g., said backpressure inhibiting the escape of volatiles from the percolator column.

10. The process of claim 9 wherein the backpressure is from 50 to 100 p.s.i.g.

* * * * *